United States Patent
Koo et al.

(10) Patent No.: US 8,045,005 B2
(45) Date of Patent: *Oct. 25, 2011

(54) SYSTEM AND METHOD FOR VIDEO TRANSMISSION LINE FAULT DETECTION

(75) Inventors: Ronald Bonshaw Koo, Mountain View, CA (US); Michael David Petersen, Colorado Springs, CO (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/623,772

(22) Filed: Nov. 23, 2009

(65) Prior Publication Data

US 2010/0073485 A1    Mar. 25, 2010

Related U.S. Application Data

(63) Continuation of application No. 11/149,986, filed on Jun. 10, 2005, now Pat. No. 7,675,544.

(51) Int. Cl.
*H04N 17/00* (2006.01)
*G06F 19/00* (2006.01)
*G01R 31/08* (2006.01)

(52) U.S. Cl. .......... 348/180; 702/65; 324/522; 324/525

(58) Field of Classification Search .......... 348/180, 348/192; 702/57, 64, 65; 330/199; 324/508, 324/509, 522, 525, 537, 536, 555, 556, 123 R
See application file for complete search history.

(56) References Cited

U.S. PATENT DOCUMENTS

| | | | | |
|---|---|---|---|---|
| 3,627,967 A * | 12/1971 | Bertolasi et al. | ........... | 219/69.19 |
| 4,497,010 A * | 1/1985 | Funahashi | ........... | 361/98 |
| 4,571,643 A * | 2/1986 | Namiki | ........... | 386/95 |
| 4,633,167 A * | 12/1986 | Kitts | ........... | 324/556 |
| 4,672,529 A * | 6/1987 | Kupersmit | ........... | 700/1 |
| 4,775,842 A * | 10/1988 | Rumreich | ........... | 330/103 |
| 5,438,271 A * | 8/1995 | White et al. | ........... | 324/444 |
| 5,491,794 A * | 2/1996 | Wu | ........... | 714/23 |
| 5,506,776 A * | 4/1996 | Fushimi et al. | ........... | 701/41 |
| 5,710,542 A * | 1/1998 | Jurisch | ........... | 340/664 |
| 6,194,869 B1 * | 2/2001 | Peterzell | ........... | 320/134 |
| 6,396,222 B1 * | 5/2002 | Lim | ........... | 315/411 |
| 6,426,632 B1 * | 7/2002 | Clunn | ........... | 324/509 |
| 6,633,474 B1 * | 10/2003 | Boudaud | ........... | 361/95 |
| 6,640,196 B1 * | 10/2003 | Unsworth et al. | ........... | 702/115 |
| 6,768,228 B1 * | 7/2004 | Fial et al. | ........... | 307/131 |
| 7,675,544 B2 * | 3/2010 | Koo et al. | ........... | 348/180 |
| 2002/0158682 A1 * | 10/2002 | Conte et al. | ........... | 327/539 |
| 2002/0166073 A1 * | 11/2002 | Nguyen et al. | ........... | 713/300 |

(Continued)

*Primary Examiner* — Victor Kostak
(74) *Attorney, Agent, or Firm* — North Weber & Baugh LLP

(57) ABSTRACT

A video circuit including a video amplifier adapted to generate an amplified output video signal from an input video signal; a short detection circuit adapted to generate a first signal indicative of whether there is a short present at an output of the video amplifier; and a load detection circuit adapted to generate a second signal indicative of whether there is a load coupled to the output of the video amplifier. The video circuit may further include an input signal detection circuit adapted to generate a third signal indicative of whether an input video signal is present. The third signal generated by the input signal detection circuit may be used to enable the outputting of the first and second signals in order to prevent the false indication of faults at the output of the video amplifier in the absence of an input video signal.

13 Claims, 3 Drawing Sheets

U.S. PATENT DOCUMENTS

2004/0162694 A1* 8/2004 Ricca et al. .................. 702/127
2005/0036248 A1* 2/2005 Klikic et al. ................... 361/42
2005/0057869 A1* 3/2005 Hale et al. ..................... 361/64
2005/0286184 A1* 12/2005 Campolo ....................... 361/42

* cited by examiner

SYSTEM AND METHOD FOR VIDEO TRANSMISSION LINE FAULT DETECTION

CROSS REFERENCE TO RELATED APPLICATIONS

This application is a continuation of U.S. patent application Ser. No. 11/149,986, filed on Jun. 10, 2005 now U.S. Pat. No. 7,675,544, and entitled "SYSTEM AND METHOD FOR VIDEO TRANSMISSION LINE FAULT DETECTION." The above-referenced Application is herein incorporated by reference.

FIELD OF THE INVENTION

This invention relates generally to video circuits, and in particular, to a system and method for detecting faults affecting the output of a video circuit, such as those present in video transmission lines.

BACKGROUND OF THE INVENTION

Video is becoming more prevalent. Many automobiles and airplanes now have DVD players and TV tuners. In addition, casinos, hotels, and public areas have ever more surveillance cameras. Such video systems are also becoming more complex because more devices are connected together. Accordingly, the number of video transmission lines in such complex video systems has grown substantially.

Because of the increasing complexity of video systems, it is now more difficult for a technician to locate and troubleshoot problems occurring in video systems, especially those having extensive routing of video transmission lines. In addressing problems in video systems, a technician has to first determine the source of the problem. For example, the problem may lie in the video input circuitry, video output circuitry, or in the video transmission lines. In addition, the technician has to then determine the nature of the problem in order to find a solution to the problem. For example, the nature of the problem may be a short or an open on a particular video transmission line.

The time needed for a technician to locate and troubleshoot such problems in video systems is often long. Accordingly, the labor cost of locating and troubleshooting problems is also likely to be relatively high.

SUMMARY OF THE INVENTION

An aspect of the invention relates to a video circuit comprising a video amplifier adapted to generate an amplified output video signal from an input video signal; a short detection circuit adapted to generate a first signal indicative of whether there is a short present at an output of the video amplifier; and a load detection circuit adapted to generate a second signal indicative of whether there is a load coupled to the output of the video amplifier. The video circuit may further include an input signal detection circuit adapted to generate a third signal indicative of whether an input video signal is present. The third signal generated by the input signal detection circuit may be used to enable the outputting of the first signal generated by the short detection circuit and the second signal generated by the load detection circuit, thus preventing the false indication of faults at the output of the video amplifier in the absence of an input video signal.

In an exemplary embodiment, the short detection circuit comprises a buffer amplifier to receive a portion of an output video signal at the output of the video amplifier, and to generate a buffered video signal therefrom; a sync tip clamp circuit to set the DC bias level of the video signal; and a video signal detect circuit adapted to generate a third signal indicative of whether the amplitude of the clamped video signal is below a threshold.

In an exemplary embodiment, the load detection circuit comprises a replica output stage adapted to generate a current related to an output current of the video amplifier; a replica load adapted to generate a replica video signal related to the replica current; a sync tip clamp circuit to set the DC bias level of the replica video signal; and a video signal detection circuit adapted to generate a third signal indicative of whether the amplitude of the clamped replica video signal is below a threshold.

In one exemplary embodiment, the input signal detection circuit comprises an edge detector adapted to generate pulses in response to detecting respective edges of a synchronization portion of an input video signal; a capacitive element to store a voltage; and a pair of push-pull transistors adapted to control the voltage across the capacitive element in response to the pulses generated by the edge detector. In another exemplary embodiment, the input signal detection circuit comprises an edge detector adapted to generate pulses in response to detecting respective edges of a synchronization portion of an input video signal; a clock; and a counter including a count output adapted to enable or disable the clock, a reset input adapted to receive the pulses generated by the edge detector, and a clock input adapted to receive a clock signal generated by the clock.

Other aspects, features, and techniques of the invention will be apparent to one skilled in the relevant art in view of the following detailed description of the exemplary embodiments of the invention.

DETAILED DESCRIPTION OF THE EXEMPLARY EMBODIMENTS

Figure 1:
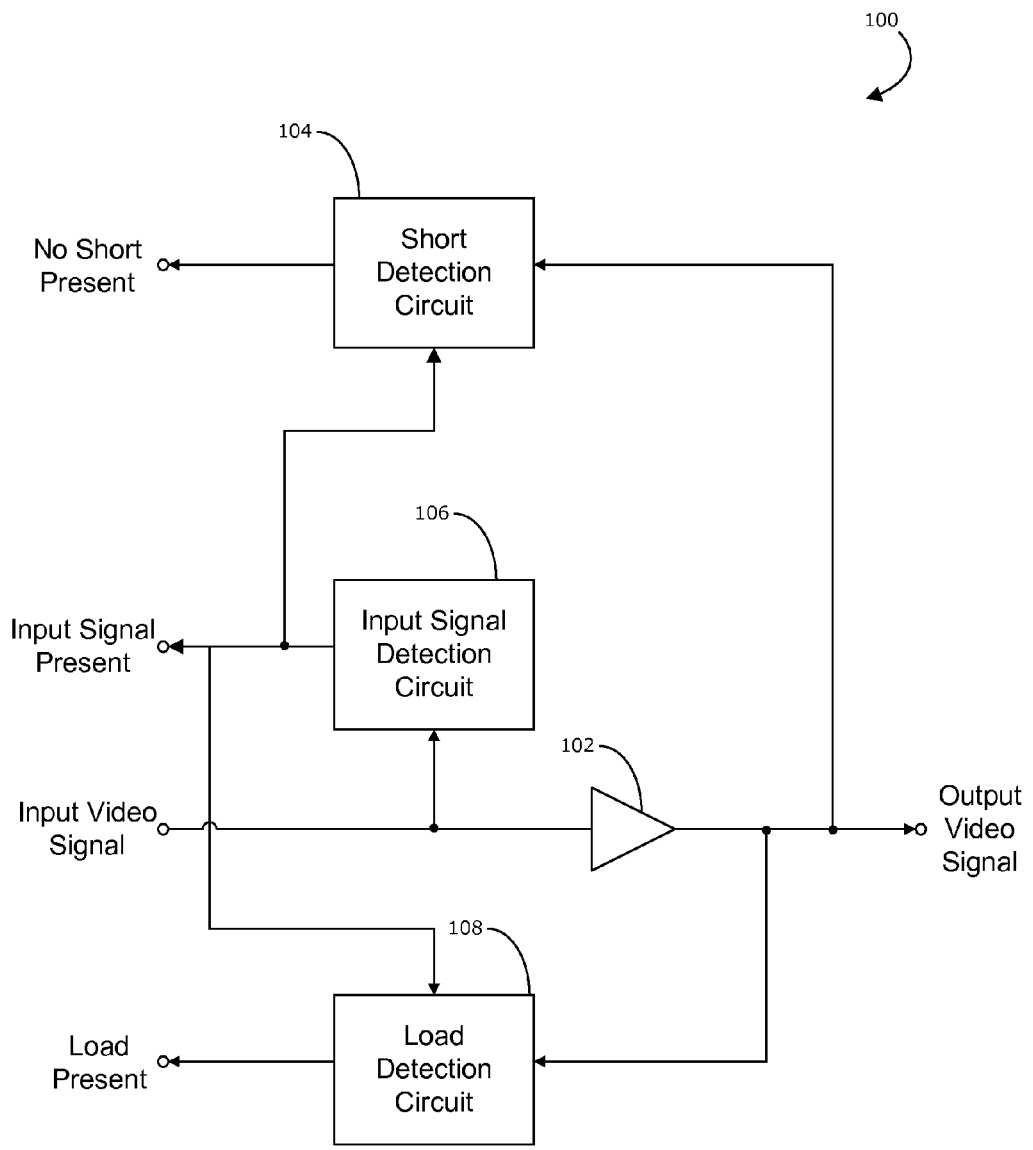
FIG. 1 illustrates a block diagram of an exemplary video circuit with output fault detection in accordance with an embodiment of the invention.

FIG. 1 illustrates a block diagram of an exemplary video circuit 100 with output fault detection in accordance with an embodiment of the invention. In summary, the video circuit 100, in addition to amplifying an input video signal, is capable of detecting faults that are present at its output. Such faults include the absence of a load connected to the output of the video circuit 100, and a short present at the output of the video circuit 100. Such faults may lie in the video transmission line connected to the output of the video circuit 100. The video circuit 100 also senses the presence of an input video signal and enables the outputs of the load and short detection circuits only when an input video signal is present to prevent false indication of faults when no input video signal is present.

More specifically, the video circuit 100 comprises a video amplifier 102, a short detection circuit 104, an input signal detection circuit 106, and a load detection circuit 108. The video amplifier 102 amplifies an input video signal to generate an output video signal. The short detection circuit 104 generates a signal indicative of whether there is a short present at the output of the video circuit 100. The load detection circuit 108 generates a signal indicative of whether there is a load connected to the output of the video circuit 100. The input signal detection circuit 106 generates a signal indicative of whether there is an input video signal present.

The signal generated by the input signal detection circuit 106 is used to enable the outputs of the short and load detection circuits 104 and 108. More specifically, when there is no input video signal present, the outputs of the short and load detection circuits 104 and 108 are meaningless. However, if an input video signal is present, the respective states of the outputs of the short and load detection circuits 104 and 108 indicate whether there is a short present at the output of the video circuit 100 and whether there is a load connected to the output of the video circuit 100. The following example illustrates a more detailed version of a video circuit having output fault detection in accordance with an embodiment of the invention.

Figure 2:
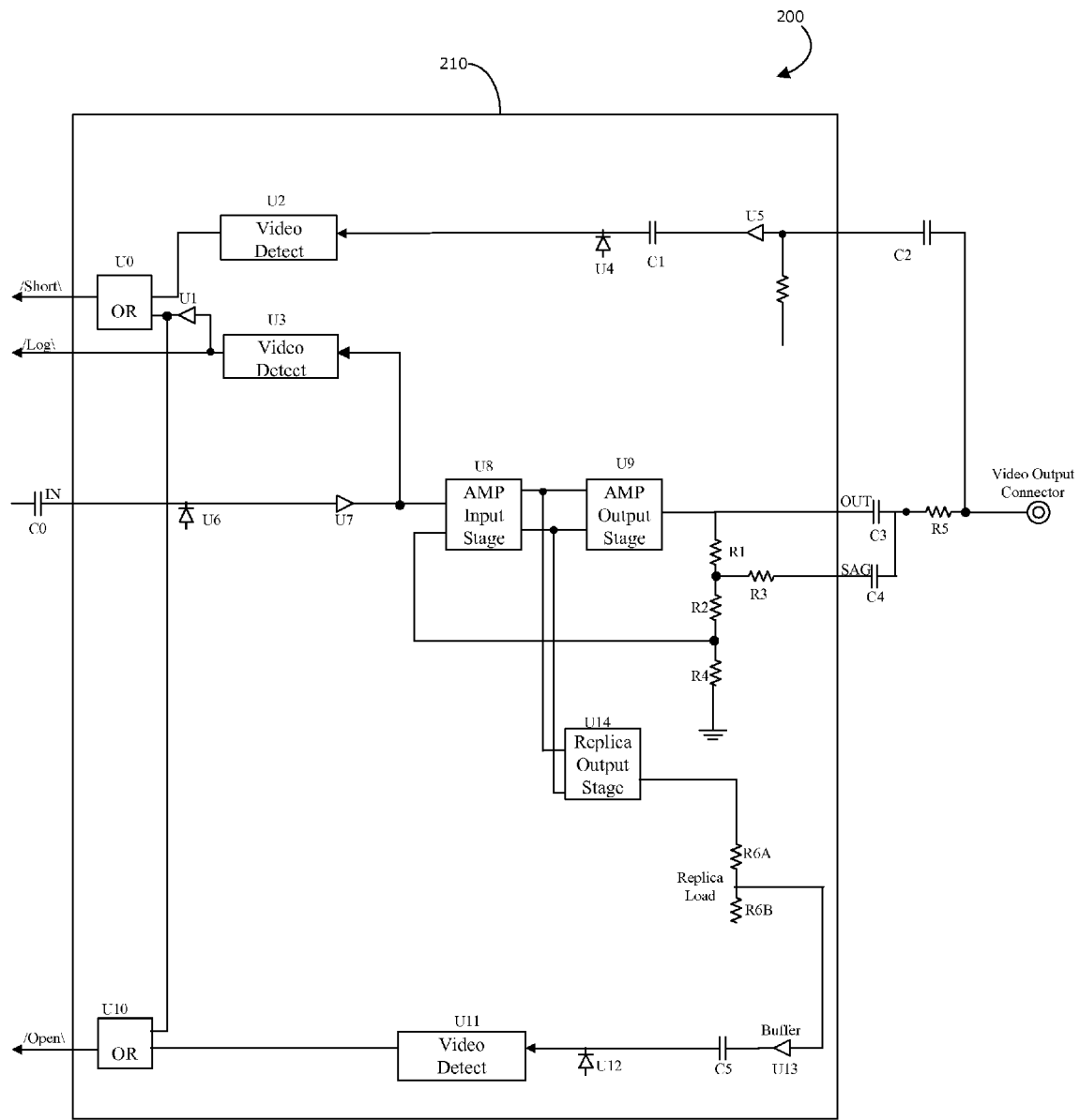
FIG. 2 illustrates a block diagram of another exemplary video circuit with output fault detection in accordance with another embodiment of the invention.

FIG. 2 illustrates a block diagram of another exemplary video circuit 200 with output fault detection in accordance with another embodiment of the invention. The video circuit 200 comprises a video amplifier section including an input capacitor C0 (e.g., 0.1 microfarad (µF)), a sync tip clamp circuit U6, a buffer U7, an amplifier input stage U8, an amplifier output stage U9, a plurality of feedback resistors R1 (e.g., 2.3 kilo Ohms (kΩ)), R2 (e.g., 580Ω), R3 (e.g., 780Ω), and R4 (e.g., 1.2kΩ), output capacitor C3 (e.g., 47 µF), SAG capacitor C4 (e.g., 22 µF), and back termination resistor R5 (e.g., 75Ω).

The video circuit 200 further comprises a short detection circuit section including a sense capacitor C2 (e.g., 0.1 µF), a buffer U5, a resistor R0 serving as a bias network for the buffer U5, a capacitor C1 (e.g., 100 picofarads (pF)), a sync tip clamp circuit U4, a video detect circuit U2, and an OR-gate U0. The video circuit 200 also comprises a load detection circuit section including a replica output stage U14, replica load resistors R6A and R6B, a buffer U13, a capacitor C5 (e.g., 100 pF), a sync tip clamp circuit U12, a video detect circuit U11, and an OR-gate U10. Additionally, the video circuit 200 comprises an input signal detection circuit section including video detect circuit U3 and inverter U1.

The operation of the video amplifier section is as follows. An input video signal is received by way of the input capacitor C0. The sync tip circuit U6 establishes a predetermined DC bias level for the input video signal by clamping the sync tip to a predetermined voltage VCLP. The buffer U7 provides isolation of the input of the amplifier input stage U8 and input of the video detect circuit U3 from external devices. The amplifier input and amplifier output stages U8 and U9, including the feedback resistors R1-R4 and capacitors C3 and C4, assist in amplifying the input video signal to generate an output video signal. The SAG capacitor C4 allows the output of the video amplifier to be AC-coupled using two smaller capacitors (C3 and C4) rather than a single large capacitor. The resistor R5 provides back termination for the video circuit 200.

The operation of the short detection circuit section is as follows. A portion of the output video signal, if present, is sensed by way of the sense capacitor C2. The buffer U5, being biased with a voltage VBIAS through resistor R0, provides isolation between the output of the video circuit 200 and the remaining circuitry of the short detection circuit section. The capacitor C1 assists the sync tip clamp circuit U4 in establishing a predetermined DC bias level for the sampled output video signal by clamping its sync tip to a predetermined voltage VCLP. The video detect circuit U2 generates a signal indicative of whether the amplitude of the clamped output video signal is below a predetermined threshold level. The OR-gate U0 passes the output signal of the video detect circuit U2 when the input video detect circuit U3 generates a signal indicating the presence of an input video signal.

In this example, the short detection circuit section operates under the assumption that when a short is present at the output of the video circuit 200, the amplitude of the output video signal is relatively small or even nil. Thus, in such a case, the amplitude of the clamped output video signal is below the predetermined threshold of the video detect circuit U2. Accordingly, the video detect circuit U2 generates a signal (e.g., a logic low signal) indicating that a short is present at the output of the video circuit 200. If, on the other hand, there is no short present at the output of the video circuit 200, the amplitude of the output video signal is relatively high. Thus, in such a case, the amplitude of the clamped output video signal is above the predetermined threshold of the video detect circuit U2. Accordingly, the video detect circuit U2 generates a signal (e.g., a logic high signal) indicating that no short is present at the output of the video circuit 200.

The operation of the load detection circuit section is as follows. The replica output stage U14 generates a replica current that is related (e.g., proportional) to the output video signal current of the video circuit 200. The replica current produces a replica video signal at the intermediate node between resistors R6A and R6B. The buffer U13 provides isolation between the output of the replica output stage U14 and the remaining circuitry of the load detection circuit section. The capacitor C5 assists the sync tip clamp circuit U12 in establishing a predetermined DC bias level for the replica video signal by clamping its sync tip to a predetermined voltage VCLP. The video detect circuit U11 generates a signal indicative of whether the amplitude of the clamped, replica video signal is below a predetermined threshold level. The OR-gate U10 passes the output signal of the video detect circuit U11 when the input video detect circuit U3 generates a signal indicating the presence of an input video signal.

In this example, the load detection circuit section operates under the assumption that when no load is present at the output of the video circuit 200, the amplitude of the output video signal current and replica current are relatively small or even nil. The small replica current through the replica load produces a small replica video signal. Thus, in such a case, the amplitude of the clamped, replica video signal is below the predetermined threshold of the video detect circuit U11. Accordingly, the video detect circuit U11 generates a signal (e.g., a logic low signal) indicating that no load is connected to the output of the video circuit 200. If, on the other hand, there is a load connected to the output of the video circuit 200, the amplitude of the output current and replica current are relatively high. Thus, in such a case, the amplitude of the clamped, replica video signal is above the predetermined threshold of the video detect circuit U11. Accordingly, the video detect circuit U11 generates a signal (e.g., a logic high signal) indicating that there is a load connected to the output of the video circuit 200.

As discussed above, the input video detect circuit U3 generates a signal indicative of whether there is an input video signal present by detecting whether the amplitude of the input video signal is above a predetermined threshold. Accordingly, if the amplitude of the input video signal is below the predetermined threshold, the video detect circuit U3 generates a signal (e.g., a logic low signal) indicating the absence of an input video signal. On the other hand, if the amplitude of the input video signal is above the predetermined threshold, the video detect circuit U3 generates a signal (e.g., a logic high signal) indicating the presence of an input video signal. The signal indicating whether there is an input video signal is referred to herein as /LOS\.

The inverter U1 inverts the output of the input video detect circuit U3. For example, when an input video signal is present, the inverter U1 generates a logic low level; and when an input video signal is absent, the inverter U1 generates a logic high level. As previously discussed, the output of the inverter U1 is coupled to the inputs of the OR-gates U0 and U10. In this configuration, the OR-gates U0 and U10 are "enabled" (i.e., pass the outputs of the respective video detect circuits U2 and U11) when there is an input video signal present (i.e., when the inverter U1 generates a logic low level signal); and are "disabled" (in this example, generates only a logic high level signal) when there is no input video signal present (i.e., when the inverter U1 generates a logic high level signal). The NO short indicating signal is referred to herein as /SHORT\ and the NO load indicating signal is referred to herein as /OPEN\.

The following illustrates a table summarizing the various faults-indicating states generated by the video circuit 200 in response to corresponding fault conditions:

| FAULT CONDITIONS | | | FAULT SIGNALS | | |
|---|---|---|---|---|---|
| Input Signal | Short | Load | /LOS\ | /SHORT\ | /OPEN\ |
| Present | None | Present | High | High | High |
| Present | Present | Present | High | Low | High |
| Present | None | None | High | High | Low |
| Present | Present | None | High | Low | High |
| None | None | Present | Low | High* | High* |
| None | Present | Present | Low | High* | High* |
| None | None | None | Low | High* | High* |
| None | Present | None | Low | High* | High* |

*Meaningless

In this example, most of the video circuit 200 is incorporated into an integrated circuit 210, with the exception of the input capacitor C0, output capacitor C3, SAG capacitor C4, sense capacitor C2, and the back termination resistor R5. Alternatively, the fault detection circuits may be incorporated into a separate integrated circuit than that of the video amplifier. In this way, fault detection may be added to existing video drivers. It shall be understood that there can be numerous implementations of the video driver circuit 200.

Figure 3:
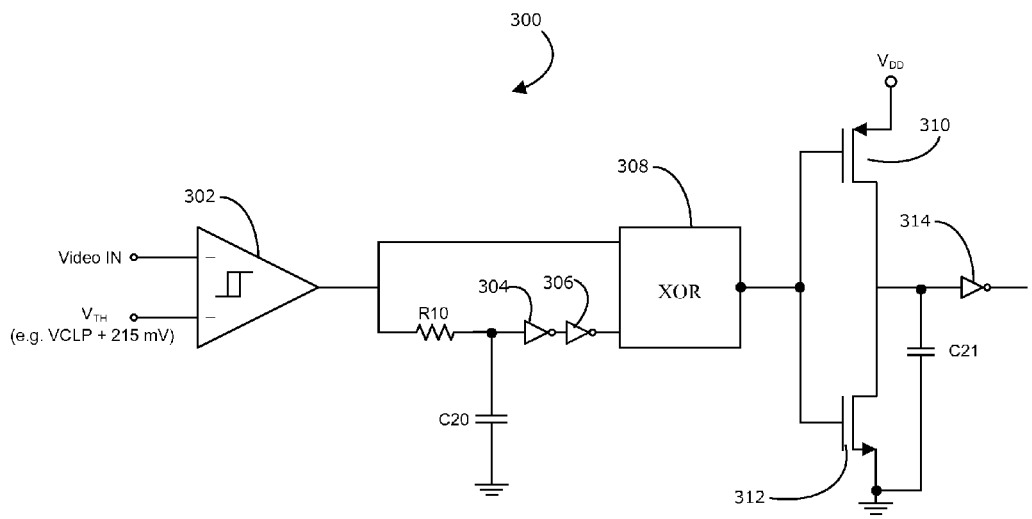
FIG. 3 illustrates a block diagram of an exemplary video signal detect circuit in accordance with another embodiment of the invention.

FIG. 3 illustrates a block diagram of an exemplary video signal detect circuit 300 in accordance with another embodiment of the invention. The video signal detect circuit 300 may serve as a detailed version of any of the video detect circuits U2, U3, and U11 of the video circuit 200 described above. In summary, the video signal detect circuit 300 generates a logic high level signal if an input video signal is detected, and a logic low level signal if an input video signal is not detected. In this example, an input video signal is detected by sensing the synchronization pulses (e.g., vertical synchronizing pulse, pre-equalizing pulse, post-equalizing pulse, horizontal sync pulse, and/or Macrovision copy-protection pulse) of the input video signal.

More specifically, the video signal detect circuit 300 comprises a hysteresis comparator 302, a resistor R10, a capacitor C20, a first inverter 304, a second inverter 306, an exclusive-OR gate (XOR) 308, a pair of push-pull field effect transistors 310 and 312, a capacitor C21, and a third inverter 314. The hysteresis comparator 302 includes a positive input terminal to receive the input video signal, a negative input terminal to receive a predetermined threshold voltage $V_{TH}$ (e.g., VCLP+ 215 mV), and an output terminal coupled to a first input of the XOR-gate 308 and resistor R10. The resistor R10, grounded capacitor C20, first inverter 304, and second inverter 306 are coupled between the output of the hysteresis comparator 302 and the second input of the XOR gate 308, and operate together as a signal time delay (e.g., 1 microsecond).

The XOR gate 308 also includes an output coupled to the gates of the push-pull FETs 310 and 312. The FET 310 may be of a p-channel type, and includes a source to receive a power supply voltage $V_{DD}$ and a drain coupled to the drain of the other push-pull FET 312. The FET 312 may be of an n-channel type, and includes a source coupled to ground. The FET 310 may be configured to have a relatively weak conduction when it is turned on, whereas the FET 312 may be configured to have a relatively strong conduction when it is turned on. The drains of the FETs 310 and 312 are coupled to a grounded capacitor C21 and to an input of the third inverter 314. The third inverter 314 generates the logic level signal indicative of whether an input video signal is present.

In operation, in the absence of an input video signal, the output of the hysteresis comparator 302 generates a constant low logic level signal (e.g., constant for more than the time delay generated by the resistor R10 and capacitor C20 (e.g., 1 microsecond)). In spite of the delay generated by the delay elements R10 and C20, the constant low logic level signal generated by the hysteresis comparator 302 results in constant low logic level signals present at the inputs of the XOR gate 308. Consequently, the XOR gate 308 outputs a constant low level signal. This constant low level signal causes FET 310 to weakly conduct, and causes FET 312 to turn off. The weakly conducting FET 310 couples the power supply voltage $V_{DD}$ to the capacitor C21, and consequently it begins to charge relatively slowly, reaching a high logic level. The inverter 314 inverts the high logic level to generate a low logic level indicative of the absence of an input video signal.

In the presence of an input video signal, the hysteresis comparator 302 generates a high logic level signal when it detects a positive edge of a sync pulse and generates a low logic level signal when it detects a negative edge of the sync pulse. Accordingly, the threshold voltage $V_{TH}$ should be set around half way between the upper and lower voltages of the sync pulse. In the hysteresis comparator 302, there are two thresholds, i.e., one for when the input voltage is increasing and one for when the input voltage is decreasing. Hysteresis prevents the output of comparator 302 from changing states frequently if the input voltage is swinging around the threshold voltage level.

When the hysteresis comparator 302 generates a high logic level in response to a positive edge of a sync pulse of an input video signal, the first input to the XOR gate 308 immediately receives the high logic level, whereas the second input to the XOR gate 308 receives the high logic level after the time delay produced by the delay elements R10 and C20 (e.g., 1 microsecond). During the delay period, the inputs to the XOR gate 308 are at different logic levels. Accordingly, XOR gate 308 generates a high logic level signal. After the time delay, the inputs to the XOR gate 308 become again the same logic levels (logic high). Accordingly, the XOR gate 308 generates a logic low level signal.

When the hysteresis comparator 302 detects the subsequent negative edge of the sync pulse, the comparator 302 generates a low logic level. The first input to the XOR gate 308 immediately receives the low logic level, whereas the second input to the XOR gate 308 receives the low logic level after the time delay produced by the delay elements R10 and C20 (e.g., 1 microsecond). During the delay period, the inputs to the XOR gate 308 are at different logic levels. Accordingly, XOR gate 308 generates a high logic level signal. After the time delay, the inputs to the XOR gate 308 become again the same logic levels (logic low). Accordingly, the XOR gate 308 generates a logic low level signal.

Accordingly, the circuit section comprising the hysteresis comparator 302, resistor R10, capacitor C20, first and second inverters 304 and 306, and XOR gate 308 operate as an edge detector. Each time this circuit section encounters an edge of a sync pulse of the input video signal, the circuit section generates a pulse having a time width approximately the delay produced by the delay elements resistor R10 and capacitor C20. The pulse generated by this circuit section causes FET 310 to turn off and FET 312 to conduct relatively hard. Thus, the voltage previously stored by the capacitor C21 is driven relatively hard to ground (e.g., a low logic level). The inverter 314 inverts the low logic level to produce a high logic level indicative of the presence of an input video signal.

Figure 4:
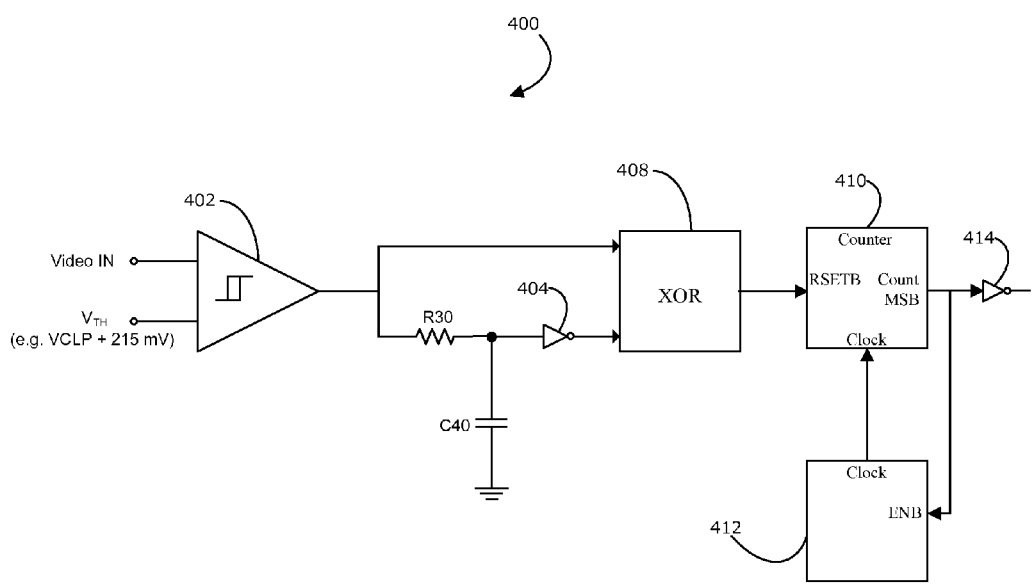
FIG. 4 illustrates a block diagram of another exemplary video signal detect circuit in accordance with another embodiment of the invention.

FIG. 4 illustrates a block diagram of another exemplary video signal detect circuit 400 in accordance with another embodiment of the invention. The video signal detect circuit 400 may also serve as a detailed version of any of the video detect circuits U2, U3, and U11 of the video circuit 200 described above. Similar to the previously-discussed video signal detect circuit 300, the video signal detect circuit 400 generates a logic high level signal if an input video signal is detected, and a logic low level signal if an input video signal is not detected. Similarly, the video signal detect circuit 400 detects an input video signal by sensing the synchronization pulses (e.g., vertical synchronization pulse, pre-equalizing pulse, post-equalizing pulse, horizontal sync pulse, and/or Macrovision copy-protection pulse) of the input video signal.

More specifically, the video signal detect circuit 400 comprises an edge detector including a hysteresis comparator 402, resistor R30, capacitor C40, inverter 404, and XOR gate 408. However, in place of the push-pull FETs 310 and 312, capacitor C12 and inverter 314 of video signal detect circuit 300, the video signal detect circuit 400 includes a counter 410, a clock 412, and an inverter 414. The counter 410 includes a reset-bar coupled to the output of the XOR gate 408, a clock input coupled to an output of the clock 412, and the count most significant bit (MSB) coupled to the inverter 414 and to the enable-bar of the clock 412.

In operation, when an input video signal is received, the XOR gate 408 generates a negative pulse each time an edge of a sync pulse is detected. The pulse generated by the XOR gate 408 causes the counter 410 to reset the count. Accordingly, the count MSB remains at a low logic level as long as another sync pulse edge is detected before the count reaches the maximum count. The inverter 414 inverts the low logic level of the count MSB to produce a high logic level indicative of the presence of an input video signal. In the absence of an input video signal, the counter 410 increases the count per each clock cycle of the clock signal generated by the clock 412. When the count reaches the maximum count, the count MSB changes from a low logic level to a high logic level. The high logic level of the count MSB, which is connected to the enable-bar of the clock 412, disables the clock. The inverter 414 inverts the high logic level to produce a low logic level indicative of the absence of an input video signal.

Although in the various embodiments of the invention described above a video signal is used to illustrate the various concepts of the invention, the exemplary embodiments of the invention are not limited to processing only video-type signals. It shall be understood that the exemplary embodiments may perform output fault detection as described above on other types of signals that exhibit some predictability. In this example, video signals exhibit some predictability because synchronization pulses are usually present and their structure are typically specified. Furthermore, although in the various embodiments of the invention described above, a video amplifier is used to illustrate the output fault detection methods and circuits described herein, it shall be understood that the output fault detection is applicable to other signal processing devices, including other video and non-video signal processing devices.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A video circuit, comprising:
   a video amplifier adapted to generate an amplified output video signal from an input video signal;
   a short detection circuit, coupled to an output of the video amplifier, the short detection circuit receives the amplified output video signal from the output of the video amplifier and generates a first signal indicative of whether there is a short present at the output of said video amplifier;
   a load detection circuit, coupled to the output of the video amplifier, the load detection circuit receives the amplified output video signal from the output of the video amplifier and generates a second signal indicative of whether there is a load coupled to said output of said video amplifier; and
   wherein the short detection circuit and the load detection circuit are distinct from each other.

2. The video circuit of claim 1, further comprising an input signal detect circuit adapted to generate a third signal indicative of whether said input video signal is present.

3. The video circuit of claim 2, wherein said short detection circuit is adapted to use said third signal to enable the output of said first signal.

4. The video circuit of claim 2, wherein said load detection circuit is adapted to use said third signal to enable the output of said second signal.

5. The video circuit of claim 1, wherein said short detection circuit comprises a video signal detect circuit adapted to generate a third signal indicative of whether an amplitude of an output video signal at said output of said video amplifier is below a threshold.

6. A circuit for determining faults at an output of a signal processing circuit, comprising:
   a short detection circuit, coupled to the output of the signal processing circuit, the short detection circuit receives an output signal from the output of the signal processing circuit and generates a first signal indicative of whether there is a short present at said output of said signal processing circuit;
   a load detection circuit, coupled to the output of the signal processing circuit, the load detection circuit receives the output signal from the output of the signal processing circuit and generates a second signal indicative of whether there is a load coupled to said output of said signal processing circuit;

an input signal detect circuit, coupled an input of the signal processing circuit, the input signal detect circuit receives an input signal from the input of the signal processing circuit and generates a third signal indicative of whether there is a signal present at the input of the signal processing circuit;

wherein said short detection circuit is adapted to use said third signal to enable the output of said first signal;

wherein said load detection circuit is adapted to use said third signal to enable the output of said second signal; and wherein the short detection circuit, the load detection circuit and the input signal detect circuit are distinct from each other.

7. The circuit of claim 6, wherein said signal processing circuit comprises a video signal processing circuit.

8. A circuit for determining whether a short is present at an output of a signal processing circuit, comprising:

a signal detection circuit, coupled to the output of the signal processing circuit, the short detection circuit receives an output signal from the output of the signal processing circuit and generates a first signal indicative of whether an amplitude of a sampled output signal related to an output signal of said signal processing circuit is below a threshold;

an input signal detect circuit, coupled to an input of the signal processing circuit, the input signal detect circuit receives an input signal from at the input of the signal processing circuit and generates a third signal indicative of whether there is a signal present at the input of the signal processing circuit;

wherein said signal detection circuit is adapted to use said third signal to enable the output of said first signal; and wherein the signal processing circuit, the signal detection circuit and the input signal detect circuit are distinct from each other.

9. The circuit of claim 8, wherein said signal processing circuit comprises a video signal processing circuit.

10. A method of monitoring an output of a video amplifier, comprising:

detecting a first signal indicative of a short condition at said output of said video amplifier;

detecting a second signal indicative of a load condition at said output of said video amplifier; and wherein the steps of detecting the first signal and detecting the second signal are performed by circuits that are distinct from each other.

11. The method of claim 10, further comprising generating a third signal indicative of whether an input video signal is present.

12. The method of claim 11, further comprising outputting said first signal in response to said third signal.

13. The method of claim 11, further comprising outputting said second signal in response to said third signal.

* * * * *